May 26, 1942.  A. S. MENASCO ET AL  2,284,473
MULTIPLE MOTOR DRIVE FOR AIRCRAFT PROPELLERS
Filed May 27, 1938  4 Sheets-Sheet 1
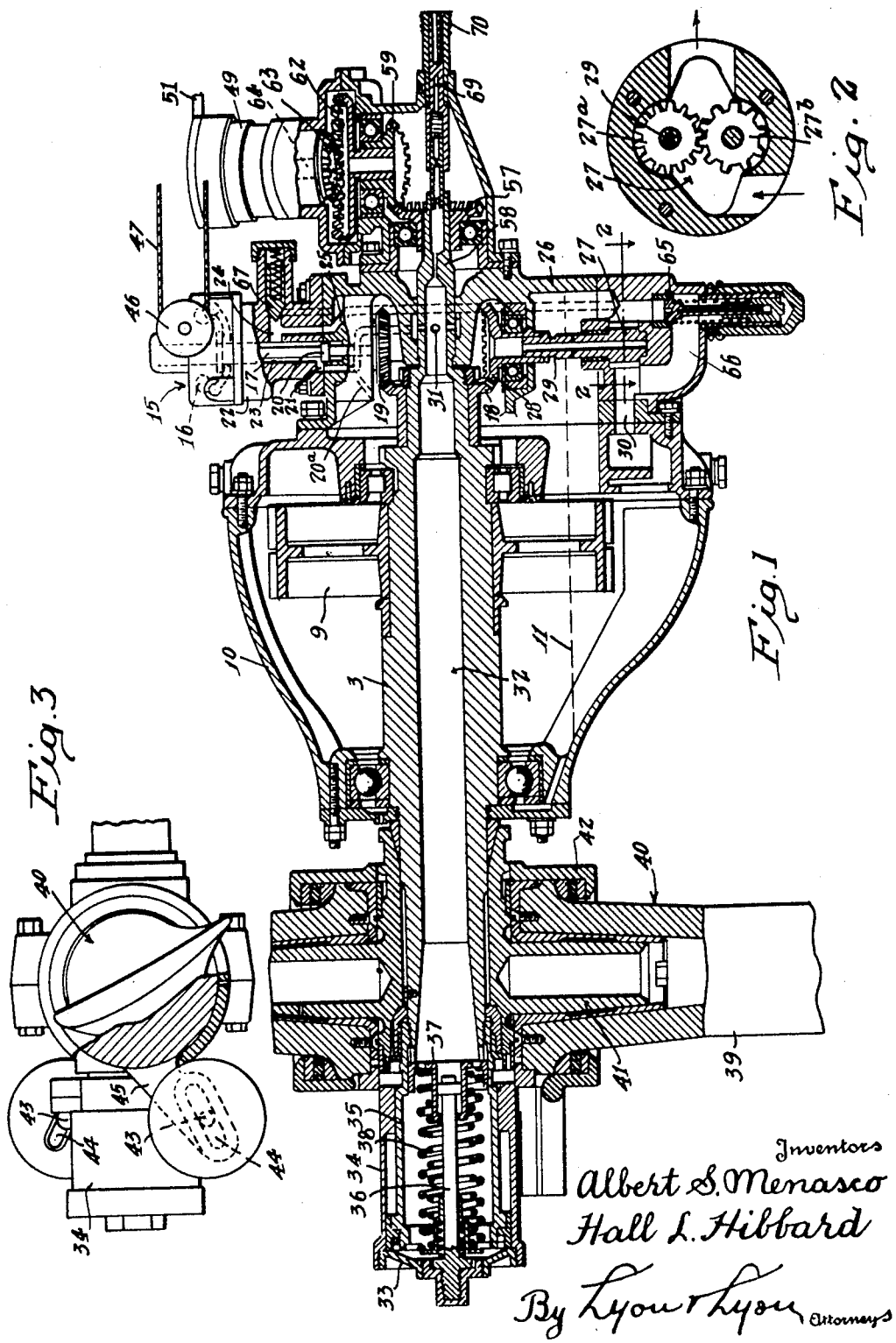
Inventors
Albert S. Menasco
Hall L. Hibbard
By Lyon & Lyon
Attorneys

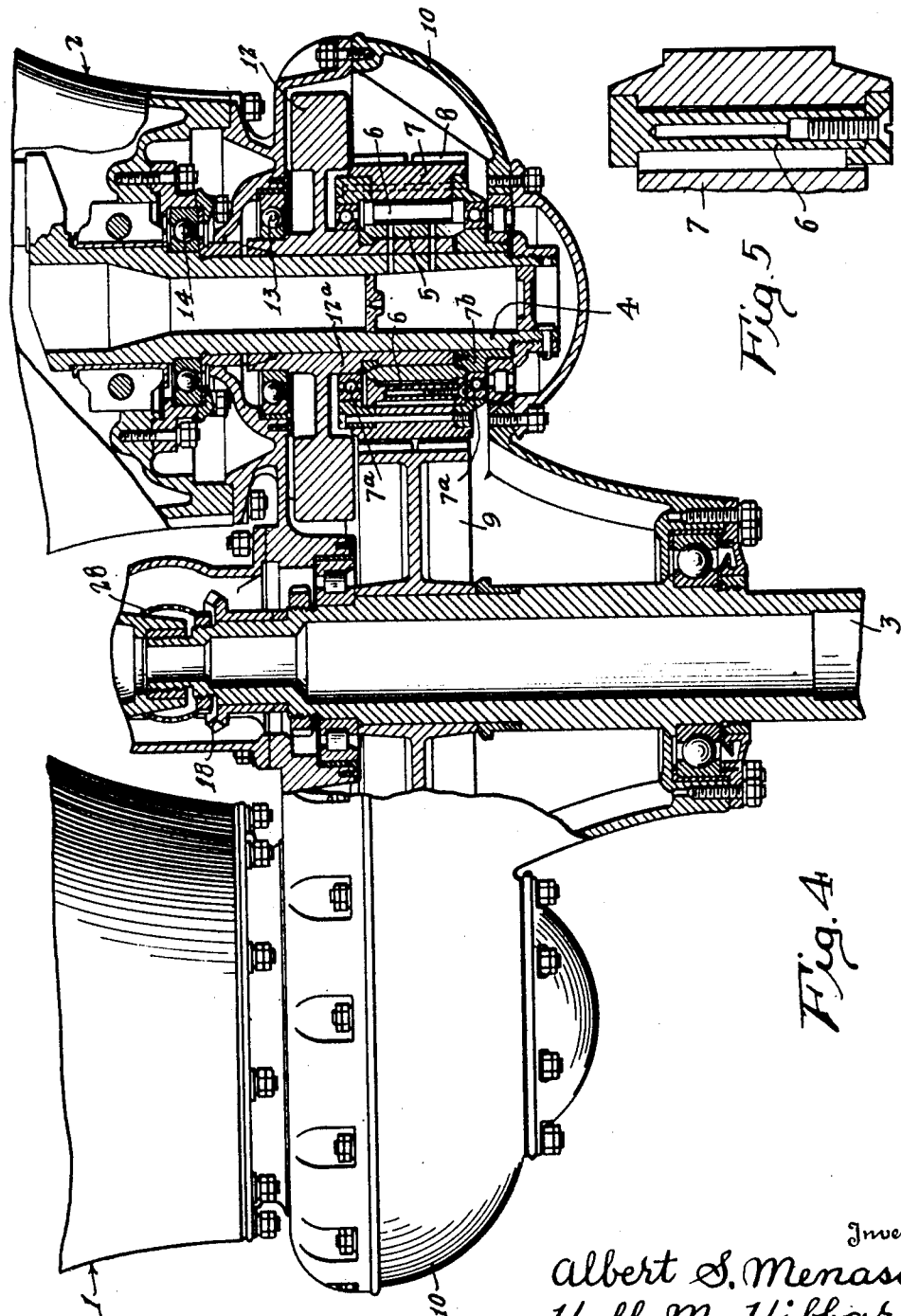

May 26, 1942.  A. S. MENASCO ET AL  2,284,473
MULTIPLE MOTOR DRIVE FOR AIRCRAFT PROPELLERS
Filed May 27, 1938   4 Sheets-Sheet 3
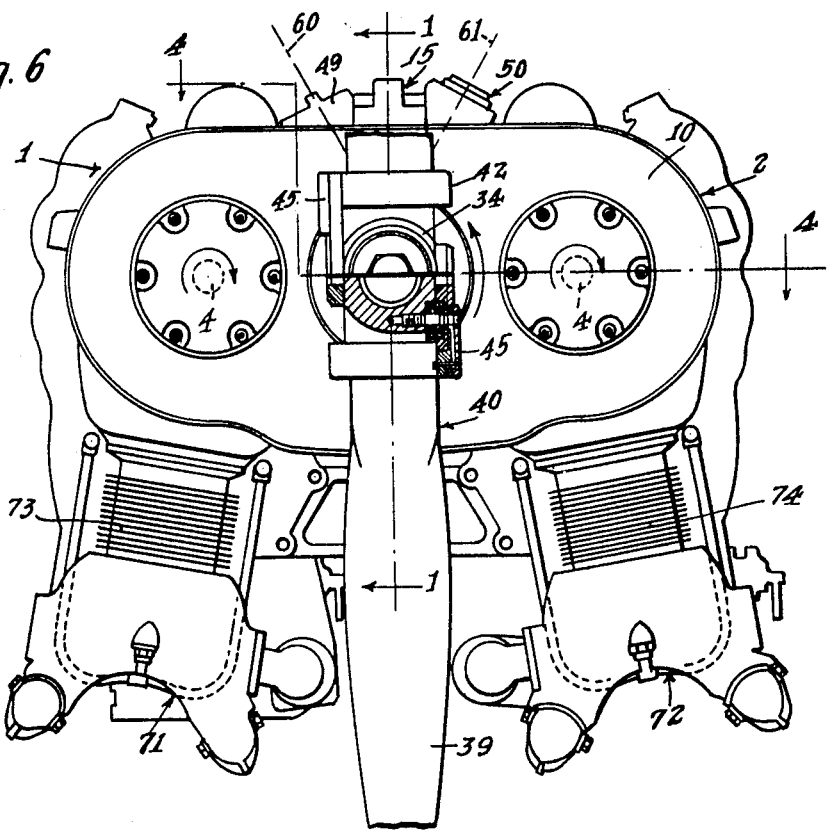
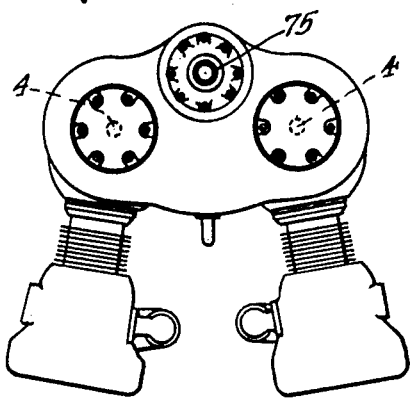
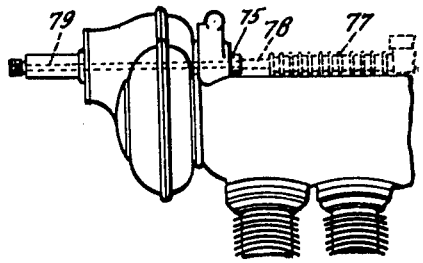
Inventors
Albert S. Menasco
Hall L. Hibbard
By Lyon & Lyon
Attorneys

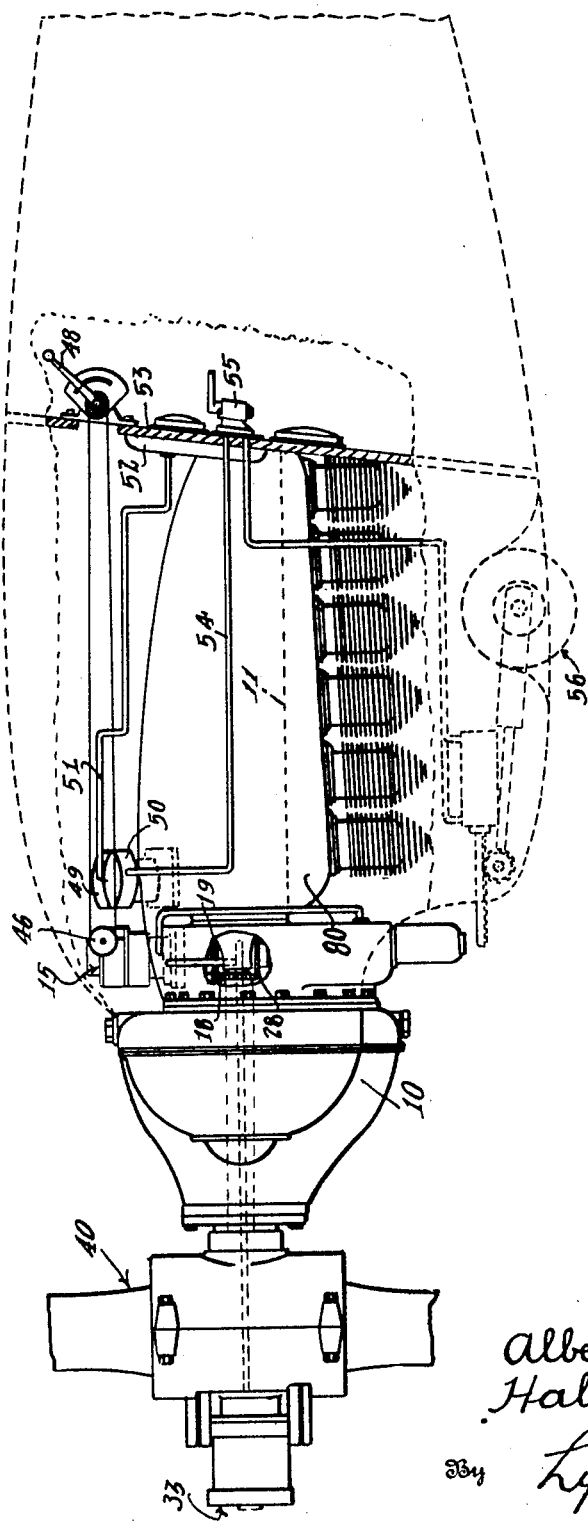

Patented May 26, 1942

2,284,473

UNITED STATES PATENT OFFICE 2,284,473

MULTIPLE MOTOR DRIVE FOR AIRCRAFT PROPELLERS

Albert S. Menasco, San Gabriel, and Hall L. Hibbard, North Hollywood, Calif., assignors, by mesne assignments, to Vega Aircraft Corporation, a corporation of California Application May 27, 1938, Serial No. 210,392

7 Claims. (Cl. 170—135.6)

This invention relates to aircraft, and particularly to aircraft propelled by a plurality of motors.

The invention is applicable to a type of multiple motor drive in which a plurality of motor units are employed to drive the same propeller shaft.

One of the objects of the invention is to provide a construction whereby a normal or predetermined driving speed of rotation of a propeller shaft may be maintained from a multiple motor system even though the driving speed of one of the motor units drops below the speed required for maintaining the propeller shaft at the selected or desired speed of rotation of the propeller shaft.

The invention is particularly useful in aircraft employing accessories driven by the main engines, for example, pumps for maintaining pressure for any purpose, such as operating landing gear, or for maintaining a partial vacuum in instruments on the dash or instrument board, that depend for their operation on the maintenance of a partial vacuum, because with the present invention, this degree of vacuum can be maintained substantially constant regardless of whether any or all of the motor units has become inactive.

Further objects of the invention will appear hereinafter.

The invention consists in the novel parts and combination of parts to be described hereinafter, all of which contribute to produce an efficient multiple motor drive for aircraft propellers.

A preferred embodiment of the invention is described in the following specification, while the broad scope of the invention is pointed out in the appended claims.

In the drawings:

Figure 1 is a longitudinal vertical section through the propeller shaft of a multiple motor-driven propeller, and showing a portion of the inner ends of the propeller blades broken away. This view also illustrates the drive to the centrifugal governor, and the drive to the accessories which are driven in common by all of the motors, or motor units. This section is taken on the line 1—1 of Figure 6.

Figure 2 is a diagrammatic section taken on the line 2—2 of Figure 1, and illustrates details of the pump which constitutes an element included in the combination embodying the invention.

Figure 3 is a plan view, with the propeller shaft broken away, and shown partially in section. This view illustrates diagrammatically the control for pitch of the propeller blades.

Figure 4 is a section taken in a general horizontal direction on the line 4—4 of Figure 6, and showing a part of the mechanism of the motor and propeller shaft in horizontal section, with the remainder of the power plant in plan, and showing the accessory drive broken away.

Figure 5 is an enlarged fragmental view of the over-running clutch mechanism embodied in our invention.

Figure 6 is a front elevation of the motor construction illustrating the cylinder arrangement, and showing portions of the propeller blades broken away, and with a portion of the pitch controlling mechanism illustrated in cross-section.

Figure 7 is a front elevation of a motor construction in which the propeller shaft is elevated above the position illustrated in Figure 6, to adapt the position of the propeller shaft to military purposes enabling a gun barrel to be aligned with the propeller shaft to enable the firearm to be fired through the shaft.

Figure 8 is a side elevation of the mode of construction illustrated in Figure 7, and further illustrating details of this type of motor.

Figure 9 is a diagrammatic view in the nature of a side elevation, and illustrating the connections of the accessories driven by the motors, to the instrument board and landing gear.

It has heretofore been suggested for many years that a multiple motor drive for a single propeller shaft might be provided wherein clutches have been interposed between the propeller shaft and the drive shafts of the individual motors. It has been suggested that through this medium a drive for an aircraft might be had wherein the aircraft might be maintained in flight even though one of the motors stops or is stopped, or is even incapacitated, so that it can no longer act as a driving element. To applicants' knowledge, no such combination has ever been flown successfully. The fundamental error residing in these suggestions has been due to the fact that when one of such motors stops for any reason, or ceases to act as a driver, that the power input to the propeller shaft is decreased to such an extent that the propeller ceases to operate efficiently with the result that it is difficult, if not impossible, to maintain the aircraft in flight. Such suggestions of a multiple motor drive for propeller shaft are contained in the early German patent to Ferdinand Porsche, No. 273,515, of April 27, 1914.

In endeavoring to utilize this principle of a multiple engine, or multiple power unit drive to a single propeller shaft, we have found that for such combination to be practically operable, it is desirable that means be provided wherein the propeller shaft may be maintained at a substantially constant speed irrespective of the power input of the shaft, or without regard as to whether or not one of such multiple power elements stops or becomes incapacitated.

In order to provide such a multiple engine hook-up to a single propeller shaft, we provide a propeller control means operated from the propeller shaft so that as the power input to the propeller shaft drops so as to normally reduce the speed of rotation of the propeller shaft, the pitch of the propeller blades varies in accordance with the power input to maintain the propeller operating at substantially a constant speed. This enables such a multiple engine hook-up to a single propeller shaft to function efficiently and to operate effectively to maintain the aircraft in flight by allowing the remaining engine or engines to turn at approximately their rated speed and deliver their full power, even though one of such power units or engines stops or is, for any reason, incapacitated.

We have also discovered that if such a multiple engine drive to a single propeller shaft is to operate effectively and reliably, it is essential that the multiple engines be so connected with the propeller shaft and the propeller shaft so arranged as to drive the essential auxiliary units so that should one of such engines or driving elements stop for any reason, or become incapacitated, that a drive will be provided to the essential auxiliaries as will maintain such auxiliary units in operation independently of the motor or engine which has stopped.

We have also discovered that in such an assembly of multiple engines or drive elements to a single propeller shaft that in order to maintain the required safety of operation it is essential that the multiple engines be isolated from each other to such an extent that should actual trouble develop in one of the engines, that the trouble developed in one engine or driving element is not immediately transmitted to the other of such elements so as to immediately incapacitate the second of such driving elements. For example, we have discovered that it is essential to maintain an independence of oil supply to the respective units of the combination so that should a bearing, valve or other part of one engine burn out, difficulty there encountered in that engine is not transmitted through the oil to the other engine or to the transmission drive provided to the propeller shaft.

In accordance with our invention, we provide a group or plurality of motor units, all of which drive the propeller shaft, with connections in the drive to the propeller shaft, which will operate to disconnect any motor unit that is stopped or stops for any reason, and combined with this mechanism, we provide a means whereby the speed of rotation of the propeller may be maintained substantially constant irrespective of the number of motor units in operation.

The means for maintaining constant propeller speed or for controlling propeller pitch referred to may be of any form well known in this art, the form illustrated being that which operates to control automatically the position of a hydraulic valve through which the controlling liquid flows to the pitch-varying means of the propellers. In accordance with our invention, we provide pump means driven by all, or any one, of the motor units for driving the operating liquid past this valve. With this organization of elements, it will be evident that in case one of the motor units, or any motor included in a motor unit, for any reason begins to operate to deliver less power, that the power input to the propeller shaft will drop off and the propeller shaft speed of operation will decrease, and this decrease in speed of the propeller shaft will be accompanied with a change in propeller blade pitch so that with the decreased power input the speed of the propeller shaft will remain substantially constant at the previously determined setting of the control device.

In accordance with our invention also, we provide means for driving the accessories of the aircraft from all of the motor units. This is also most conveniently accomplished by effecting the drive through the propeller shaft which is, of course, driven by all the motor units. In this way instruments on the instrument board of the aircraft depending for their operation upon a partial vacuum, can be maintained fully operative in case of stopping of, or an accident to, any motor unit by reason of the fact that substantially the same normal partial vacuum can be maintained at the instrument board in spite of the fact that one or more of the motor units or an engine included in the same, may have become inoperative. This feature also enables the hydraulic pressure for liquid to operate, for example, a hydraulic landing gear, to be maintained at its normal pressure, thereby insuring that even if some one or more of the motor units is out of service, the landing gear will be supplied with operating fluid, or liquid, at the pressure which it would have under normal conditions.

Referring more particularly to the parts and especially to Figures 1 to 4, the power plant illustrated involves the use of two motor or engine units 1 and 2, disposed alongside of each other, and slightly apart so as to provide space between the same for a propeller shaft 3. These motor units 1 and 2 may consist of single engines, or they may consist of a plurality of motors operating to drive the shafts 4 of the motor units 1 and 2. Between the shafts 4 of the motor units and the propeller shaft 3 are provided one-way driving connections which enable each motor to drive the shaft 3, but which permit the shaft 3 to rotate without rotating a motor crankshaft in case a motor ceases to rotate, or one or more shafts 4 rotate at a speed below the speed essential to the maintenance of a drive from such shaft 4 to the shaft 3. For this purpose we provide a one-way drive, or over-running clutch, or free wheeling clutch, of any suitable or desirable construction and, as here illustrated, comprising an inner hub or cam 5 rigidly connected with the shaft 4 having a plurality of inclined faces, not illustrated, on which ride rotary members such as rollers, one of which is indicated by the reference numeral 6 in Figure 4. The clutch includes an outside ring or driven clutch member 7, so that in the forward direction of rotation for the motor unit, the roller or rollers 6 will jam between the rings 5 and 7 and cause the ring 7 to rotate in unison with the motor shaft. This ring 7 at its outer portion is formed with gear teeth 8 so that it constitutes a pinion, and this pinion meshes with a gear 9, which is rigid on the propeller shaft 3.

In order to support the gear ring 7 so as to maintain the same in constant mesh with the propeller shaft gear 9, and to prevent the same from riding on the rollers 6 when the free wheeling clutch is disengaged, we prefer to mount the gear ring 7 so as to maintain its axis of rotation at all times constant and coincident with the axis of rotation of the drive shafts 4, and we prefer to support said gear ring 7 upon bearings 7a, as illustrated in Figure 5. The bearings 7a may be of any suitable type, but are herein illustrated as of the ball type. The bearings 7a are supported upon the collar 7b and hub 12a of the inertia means or fly wheel 12, respectively.

The transmission drive from the two motor or engine units to the propeller shaft 3 and the supporting bearings for the shaft 3, are housed within a common casing or housing 10, the lower portion of which constitutes an oil reservoir in which the oil level is indicated at 11.

Adjacent each driving clutch composed of the clutch members 5 and 7, a fly wheel 12 is provided rigid with the shaft 4 of the motor unit and, of course, suitable bearings such as the ball bearings 13 and 14 are provided for the motor shaft.

Referring particularly to Figures 1, 2 and 3, 15 indicates a constant speed propeller control means. The centrifugal mechanism of this constant speed means is indicated by the dotted lines 16 in Figure 1, and this mechanism is driven by a shiftable shaft 17. The governor including the governor weights 16 and their association with the shaft 17 is of common construction well understood in the art wherein the movement of the governor weights as driven by the shaft 17 also acts to move the shaft 17 vertically as viewed in Figure 1, depending upon the rate of drive of the shaft 17. This shaft 17 also functions as a valve, as will appear from inspection of Figure 1. We provide means for driving this shaft 17 from all of the motor units, and this is preferably accomplished by driving it from the propeller shaft 3. In order to accomplish this, the propeller shaft is provided with a rigid beveled gear wheel 18 that meshes with a corresponding beveled gear 19 on the lower end of the shaft 17. The bevel gear 19 is non-rotatably mounted with relation to the shaft 17 in any suitable manner well understood in the art such, for example, as being operatively connected therewith through the medium of a spline connection permitting relative longitudinal movement of the gear and shaft by preventing relative rotation thereof. The constant speed control means illustrated is of a common form commonly known as the "Hamilton standard constant speed propeller governor unit" so that a full and detailed description of said means is believed unessential to a complete understanding of our invention to those skilled in the art. It is believed sufficient to a complete understanding of our invention to state that said control means includes a means whereby the governor control may be adjusted for different "constant" speeds of the propeller shaft. For a complete understanding and illustration of said Hamilton constant speed propeller control means, reference is made to the September 1936 issue of the magazine "Aero Digest."

Referring now to Figure 1, the valve 17 in operation, is raised or lowered through the agency of the centrifugal mechanism 16, so that the valve head 20 can lap more or less across a port 21 formed in the casing member 22, and above the head 20 a valve chamber 23 is formed into which a fluid or liquid can be admitted through a port 24, this port being constantly supplied with fluid, preferably a liquid such as oil, through a passage 25 formed in the casing member 26. When the aircraft is flying, the operating fluid or oil is constantly driven up through the passage 25 from a pump 27, and this pump is continuously driven from the propeller shaft, or by other means which is driven by all of the motor units. It is, however, most advantageous to drive this pump from the propeller shaft, and in order to accomplish this, we utilize the beveled gear 18 already referred to, which meshes with a beveled gear 28 which is attached to the upper end of a shaft 29, which carries one of the gears 27a of the pump. This pump is preferably of the gear type, involving the use of two meshing gear wheels 27a and 27b, which are driven in the direction indicated (see Figure 2) to take oil from the pump intake 30, which is below the level 11 of the oil in the reservoir. The port or passage 21 leads down through the casing 26, and delivers the oil through ports 31 into the bore 32 of the propeller shaft, and this oil passes to the forward end of the propeller shaft where it exerts its pressure against a head 33, which is rigidly secured to the barrel 34, said barrel being arranged to slide freely in the usual manner on a guide tube 35. The head 33 carries the usual central stem 36, which carries a collar 37 at its inner end, against which the springs 38 of this control device thrust. It should be understood that this control device is not part of our invention, but is an element of our combination and functions to control the pitch of the blades 39 of the propeller 40. However, it should be understood that any kind of variable pitch propeller may be employed, and any type of means for varying the pitch. In the present instance, the blades 39 of the propeller are mounted to rotate on radial arms 41 of the propeller hub 42, and by being rotated into different positions, the pitch of the propeller blades, of course, is changed. In the standard type of pitch control illustrated in Figures 1 and 3, the barrel 34 is provided with projecting pins 43 that move in inclined slots 44 formed in radial arms 45 that project outwardly from the root of the propeller blade 39 (see Figure 3). In this type of control device it will be evident that as the cylinder or barrel 34 moves in and out, as controlled by the governor 15 and the valve 17, the pitch of the blades will be adjusted to the power input to the shaft to maintain the selected speed of rotation of the propeller shaft 3.

The centrifugal governor 15 is provided with means for adjusting the same, which is controlled from the cockpit of the aircraft; in the present instance, this involves the use of a pulley 46 from which a cable 47 extends rearwardly to the cockpit, at which point it may be controlled by a lever 48 (see Figure 9).

With this organization of parts, it will be evident that the valve 17 will control the supply of liquid under pressure to the bore 32 of the shaft, and thereby control the pitch of the propeller blades. If the speed of the propeller shaft is too great, the valve head 20 will move up sufficiently to permit the liquid to escape under it from port 21, thereby reducing the pressure under head 33. The springs 38 then move the barrel 34 inward, which increases the propeller pitch. The liquid passing under the valve head returns by a port 20a (Figure 1) to the gear case.

At the rear end of the propeller shaft and between the crankcases of the motors 1 and 2, we provide a vacuum pump 49 and an oil pump 50 (see Figures 6 and 9), the former of which is connected by a suitable conduit 51 to a vacuum chamber 52 on the back of the instrument board 53, which carries the flying instruments that are vacuum-controlled. The pump 50 is connected by a conduit 54 to a control device such as a valve 55, which may be operated by the aviator to admit oil under pressure to landing gear 56, illustrated diagrammatically in Figure 9. The vacuum pump or air pump 49, and the pump 50, are also driven in common by all of the motor units, and this is preferably accomplished by driving the same from the propeller shaft 3. The gearing for this purpose is illustrated in Figure 1, and involves the use of a beveled gear 57 rigid on a reduced neck 58 at the rear end of the propeller shaft 3, and meshing with a beveled gear such as the beveled gear 59 (see Figure 1), corresponding to the vacuum pump, or the oil pump. These pumps are located with their axes inclined. In Figure 6 the dotted lines 60 and 61 indicate the positions of their axes. Referring again to Figure 1, the shaft of the beveled gear 59, drives a large beveled gear 62 that meshes with a pinion 63 on the shaft 64 of the vacuum pump. Mechanism similar to this may be employed for driving the oil pump 50. By reason of the location of the axes of these pumps as indicated in Figure 6, clearance is provided for enabling this drive for these pumps to be employed.

While we have herein specifically illustrated some of the accessory units as driven from the propeller shaft 3, we do not intend to limit our disclosure to these specific accessories, but these are specifically illustrated and described for illustrative purposes only, it being fully understood that such necessary units may as a whole be driven from the propeller shaft, including as a further example, the generator, etc.

In connection with the pump 27 that develops oil pressure in the duct 25 (see Figure 1), it is desirable to provide a relief valve 65 which, if the pressure developed in the duct 25 becomes too high, will open and permit the oil to pass through a by-pass 66 back to the intake side of the pump. In addition to this if desired, a similar relief valve 67 may be provided at the port 24, which admits the oil under pressure into the valve chamber 23 (see Figure 1). If the pressure at this point becomes too high, this relief valve will open and permit the oil to by-pass downwardly through a passage 68 back into the oil reservoir.

The rear end of the propeller shaft 3 may be provided with an extension 69 having a coupling connection 70 at its end for connecting a tachometer drive to the propeller shaft.

While this invention may be applied to multiple motor drives of any type, having individual motors of any type, in the present instance we have illustrated the invention as applied to two inverted in-line motor units 71 and 72, the cylinders 73 and 74 of which are disposed with their vertical axes in an inclined position, and so that the cylinders are located below the motor shafts 4 (see Figure 6). Such motor units may assume any desired position and may even be mounted with their cylinders in horizontal position should it be desirable to mount these propeller driving units in the wings or other positions of the aircraft.

As indicated by the arrows in Figure 6, the two motor units drive their shafts 4 in the same direction, and if these motors rotate their shafts in a clockwise direction, of course the propeller shaft will rotate in a counter-clockwise direction. However, it should be understood that the shafts of the motor units may rotate in either direction for which they are designed. In practice, it is preferable to have the propeller rotate in the usual direction in the country for which the aircraft is to operate. The direction of rotation indicated in Figure 6 is the usual one for propellers in the United States. On account of the fact that the shafts of the motor units must rotate in the opposite direction, it follows that if engines having the usual direction of rotation are employed, the timing mechanism and valve mechanism, must be reversed or otherwise adapted in order to rotate the engines in the opposite direction.

In the type of construction illustrated in Figure 6, the propeller shaft is at the same level and between the motor shafts 4. Our invention is also applicable, however, to a type of construction illustrated in Figures 7 and 8, in which the propeller shaft 75 is elevated above the motor shafts 4. This modification will adapt the motor construction for use in military aircraft because it will provide clearance at the rear end of the propeller shaft between the engines or motors to enable the firearm 77 to be set up with its barrel 78 extending into the bore 79 of the propeller shaft.

In accordance with our invention, the propeller driving unit consisting of the multiple motors or engines, and the transmission mechanism to and including the propeller shaft, are preferably formed as independent units in that each is provided with its own housing or oil case. The crank case 80 of each motor is independent and independent of the housing or case 10 of the transmission, and each contains an independent lubricant. The lubricant circulation in each is independent of the other. We have found for example that if dependent circulation of lubricant through the three cases is attempted in an airplane, there is always exhibited a tendency of one motor to rob the other of its oil; also should one motor fail in operation through such a happening as burning out a bearing, the oil as contaminated with such burnt out bearing particles, would immediately contaminate the oil of the other motor.

The mode of operation of the entire apparatus will now be briefly stated.

Under normal conditions the propeller shaft 3 is driven by all of the motor units included in the power plant for driving the aircraft. If either of the motor units of the apparatus described becomes incapacitated and fails to drive the propeller shaft through its corresponding one-way drive clutch composed of the clutch members 5 and 6, the propeller shaft will continue to be driven by the remaining active motor unit. Although in the present disclosure only two motor units are illustrated, of course any number of motor units may be employed driving the same propeller shaft.

The propeller shaft will rotate without of course driving the shaft of any inactive motor unit. As the load on all or the remaining active motor units or motor unit is relatively large, the motor will, of course, slow up temporarily, and this will affect the centrifugal mechanism 16, thereby causing a shifting of the control valve 17, causing the same to increase the amount of opening of the port 21, and this will permit an increased flow of liquid into the bore 32 of the propeller shaft and thereby increase the hydraulic pressure against the inside of the head 33 of the barrel 34. The barrel will then shift outwardly or toward the left, as viewed in Figures 1 and 3. This will shift the pin 43 and will cause a rotation of the propeller blades on their longitudinal axes, in a direction to reduce their pitch; for example, as indicated on the adjacent blade illustrated in Figure 3, this blade will be rotated on its axis in a clockwise direction.

The reduction of the pitch of the propeller blades will enable the remaining active motor units to rotate at an increased speed, and if the parts are properly adjusted, within a short time after a motor unit has become inactive, the remaining motor units will accelerate by reason of the reduced resistance in rotating the propeller with the reduced pitch for its blades.

The specific example herein above set forth refers to the case of the failure of one power plant. The same operation is effected when one power unit or plant is delivering full horse power as under "full throttle," and the other power plant or unit is operating at less power output either purposely or due to poor functioning of one of the engines.

By reason of the fact that the remaining active motor units will adapt themselves to rotate at their normal speed, that is to say, their normal speed of operation when all of them are in operation, the vacuum pump 49 and the pump 50 for the hydraulic landing gear will also be driven at their normal speeds. This will insure that the same degree of vacuum will be maintained at the instrument board as in normal flying, with all of the motor units intact, and also insures that the requisite pressure will be maintained in the operating liquid for the hydraulic landing gear. While we have indicated only these two pumps as accessories driven from the propeller shaft and maintained at their normal operating speed, even after one of the motor units has become inactive, it should be understood that in accordance with our invention, any other accessory that is driven in unison with the motor units would also be maintained at its normal or proper operating speed.

It is to be understood that the embodiment of the invention described herein is only one of the many embodiments this invention may take, and we do not wish to be limited in the practice of the invention, nor in the claims, to the particular embodiment set forth.

We claim:

1. In an aircraft propelling mechanism, the combination of a plurality of motor units, a propeller shaft, a propeller with variable pitch blades carried on the propeller shaft, a transmission drive including a one-way drive connection of the jamming roller type between each motor unit and the propeller shaft comprising a gear ring mounted on bearings to maintain said gear ring in concentric relation to the crankshaft of the motor unit, hydraulic controlling means including a governor for moving the blades to vary their pitch and thereby govern the propeller to a predetermined speed, a gear case for said transmission drive having an oil reservoir therein, said hydraulic controlling means having a pump with an intake for receiving oil from said reservoir, means for driving said pump from the propeller shaft, a duct leading from said pump to said governor, a return duct for returning liquid from said governor to said oil reservoir, said controlling means operating to vary the pitch of said propeller blades if one or more of said motor units becomes wholly or partly inactive, thereby enabling the remaining active motor unit or units, the propeller shaft, and the pump to maintain their previous speed of rotation.

2. In an aircraft propelling mechanism, the combination of a plurality of motor units including rotative inertia means for each motor unit, a propeller shaft, a hydraulically controlled variable pitch blade propeller carried on the propeller shaft, a one-way drive connection between each motor unit and the propeller shaft, said one-way drive connection including gear means carried by the propeller shaft meshing with driven gears of the motor units and jamming rolling type one-way clutches interposed between the motor gears and the motor shafts, hydraulic controlling means including a hydraulically operated pitch changing motor, a centrifugal element to govern the propeller to a predetermined speed, and having a valve therein through which operating liquid flows to said variable pitch blade propeller, a pump driven by the propeller shaft and delivering the liquid to said valve, said controlling means operating to vary the pitch of said propeller blades if one or more of said motor units becomes inactive.

3. In an aircraft propelling mechanism, the combination of a plurality of motor units including rotative inertia means for each motor unit, a propeller shaft, a hydraulically controlled variable pitch blade propeller carried on the propeller shaft, a one-way drive connection between each motor unit and the propeller shaft, said one-way drive connection including gear means carried by the propeller shaft meshing with driven gears of the motor units and jamming rolling type one-way clutches interposed between the motor gears and the motor shafts, a hydraulically operated pitch changing motor, controlling means including a centrifugal element for governing the propeller to a predetermined speed, said centrifugal element having a valve therein through which operating liquid flows to said variable pitch blade propeller, and also a relief valve associated therewith for maintaining normal operating pressure at said centrifugal element, a pump driven by the propeller shaft for delivering liquid to said centrifugal element, said controlling means operating to vary pitch of said propeller blades if one or more of said motor units becomes inactive.

4. In an aircraft having a propelling mechanism, a pair of motor units mounted in side by side relation, each having its own crank shaft, crank case and inertia means and there being an auxiliary unit separate from the propeller common to and vital for the operation of the aircraft, a propeller shaft, a variable pitch propeller carried thereby, a one-way releasable drive connection between the motor unit crank shafts and the propeller shaft whereby the power input from the motor units may be utilized regardless of their quantitative variations to drive the propeller shaft at substantially constant speed, and means for driving the auxiliary unit common to the aircraft from the propeller shaft whereby the auxiliary unit may be maintained in operation even though either of the motor units is inactive.

5. In an aircraft propelling mechanism, the combination of a plurality of motor units, an aircraft propeller shaft, a propeller mounted thereon, one-way drive connecting means between the motor units and the propeller shaft releasable to allow free wheeling of the propeller shaft, an accessory unit common to the motor units for operating a device separate from the propeller and vital to the operation of the aircraft, means for driving the accessory unit from the propeller shaft whereby the accessory unit will be driven irrespective of the operation or non-operation of the motor units.

6. In an aircraft propelling mechanism, the combination of a pair of motor units mounted in side to side relation, a propeller shaft, an aircraft propeller mounted on the propeller shaft, a one-way drive connecting means between each motor unit and the propeller shaft and automatically releasable from the propeller shaft when the rotational speed of the propeller exceeds the rotational speed of a motor unit, means for operating auxiliary devices separate from the propeller and vital to the operation of the aircraft, said means being drivably connected to said propeller shaft to be driven thereby irrespective of the operation or non-operation of the motor units.

7. In an aircraft, the combination of a plurality of motor units; a propeller shaft having a propeller mounted thereon; power transmission means between each of said motor units and said propeller shaft, said power transmission means including one-way clutches; a gear case enclosing said power transmission means, said gear case having an oil reservoir therein; a pump having an intake communicating with said oil reservoir; and means for driving said pump from said propeller shaft, whereby said propeller, by windmill action, can maintain fluid under pressure necessary for operation of said aircraft in the event of failure of said plurality of motor units.

ALBERT S. MENASCO.
HALL L. HIBBARD.